Patented Sept. 6, 1932

1,876,090

UNITED STATES PATENT OFFICE

LE ROY V. STRASBURGER, OF BALTIMORE, MARYLAND

FOOD COMPOUND

Application filed May 28, 1930. Serial No. 456,823.

No Drawing.

My invention relates to improvements in food compounds and embodies a novel product and method of preparation.

More particularly, the invention has for its aim the production of a preserved and sterilized oyster stew preparation, which may be put up and sold in suitable containers, for consumption at a later date, after the manner of the so-called canned foods.
It is a further object of the invention to produce an oyster stew that may be sterilized by steam under pressure or heated to high temperatures without coagulation and still retain the flavor, odor, and appearance of the material that was originally filled into the container.

Heretofore attempts to obtain a preserved food of this type have failed primarily because the product was not merchantable due to its unattractive appearance.

It will be understood that the usual oyster stew or soup as its essential ingredients comprises milk, either fresh milk, condensed or evaporated milk or milk powder, butter, seasoning, and oysters, with or without the oyster liquor. The stew is prepared by heating the mixture and served hot or cold.

The obstacles heretofore encountered in making preserved sterilized preparations of this character have been the tendency of the milk to curdle, and a breaking down of the proteins and albuminous matters contained in the mixture, notably the oyster liquor, with resultant precipitation and flocculation.
Thus, when attempts were made to sterilize the mixture in hermetically sealed containers, the ultimate product was found to be so unsightly that it was not salable.

It is well known that when a substance is mixed with normal sweet milk, or milk in the various forms above mentioned, the presence of excess mineral salts, such as sodium chloride or common salt, or a resultant acidity of fresh milk, will cause a coagulation of the milk proteins, which phenomenon is popularly known as curdling. Heat greatly accelerates this action. Oyster juice and oysters contain salt, and are, at the same time, of a lower PH than milk. Therefore, when mixed together and heated at temperatures necessary for sterilization, curdling develops, and as stated above, the product, although edible, does not possess an appetizing appearance. Furthermore, the heating of the oyster liquor to temperatures normally used for sterilization in hermetically sealed containers, is attended by a breaking down of the albuminous and protein matters with resultant precipitation and accompanying chemical change in the several ingredients.

In the main, it is these factors which as explained have contributed in the past to failure to produce a commercially acceptable preserved and sterilized oyster stew preparation.

My product overcomes these difficulties and disadvantages by means of a process which will now be described.

Essentially, this method comprises the addition to the mixture containing the ingredients for an oyster stew, of a colloidal substance which acts as a dispersion agent o thickener and appears to have the effect of protective colloid. The role of this process stance in the mechanism of this process which it exerts a preservative action may due to various causes such as particle sep tion, dispersion and the prevention of glutination by or through dispersion. rious agents capable of exerting this fun may be employed, and I have found, fo ample, that members of the carbohydr ries may be successfully used. C starches which I have used to advant corn starch, wheat and potato starc well as durum wheat starch. It will b stood that other members of the c drate series and other vegetable starc be used by me in the practice of my i with equal success.

Since corn starch has been foun the process will be described usin stance.

My method comprises adding t ture of oyster liquor, butter, mil soning, with or without oysters, 10% of corn starch. This starcl or in the form of a thin paste, i: the mixture which may be in a heated to a moderate temperat perature at or below boiling, preferably approaching boiling. The mixture is agitated and heated and the temperature raised preferably above 180° F., or as required, which results in a gradual thickening of the mass, dependent upon the quantity of starch used.

The starch, in contact with the contained water of the mixture, becomes hydrated and swells considerably. This addition of the starch and its subsequent hydration results in a homogeneous product which distributes the butter fat and added butter evenly through the mass.

I have found that when heated to sterilizing temperatures as 250° F. or higher will not show a coalescence of the fat particles. Furthermore, the hydrated starch exerts a protective action upon the particles of milk and oyster liquor or juice, and prevents coagulation.

Therefore, it is possible to run the stew so prepared into suitable containers which are hermetically sealed, and thereafter submitted to sterilization at a high temperature, without fear of curdling or precipitation, due to breaking down of the albuminous and protein matters. In this manner, a stable and attractive edible product is obtained which will keep indefinitely.

The sterilization is at the usual temperature, namely, 250° F. or higher while the container is sealed, and may be accomplished in a hot liquid bath or by steam under pressure. It will be understood, however, that the sterilization temperature may vary above or below 250° F. as occasion may require.

In the manufacture of this product, the stew may be prepared with or without the oysters. If it is desired, the raw oysters may first placed in the container and the stew prepared from milk, butter, oyster juice, starch and seasoning added thereto before canning, or the oysters may be used directly in the preparation of the stew and the entire material filled into the ultimate container. Also, the oysters may be prepared in the stew and later separated and filled into the container separately.

It will be understood that various modifications and equivalents may be resorted to without departing from the spirit of the invention or its scope as set forth in the appended claims.

sterilized oyster stew preparation ... milk and a substantially pure ...

sterilized oyster stew preparation ... milk and corn starch up to substantially ten per cent of the mass and in swelled condition.

... process of producing a sterilized ... preparation comprising the steps ... with milk and other normal ingredients of the stew a substantially pure starch and sterilizing the mass.

4. The process of producing a sterilized oyster stew preparation comprising heating the normal ingredients of the stew including milk to a temperature substantially approaching boiling, adding a substantially pure starch, and heating until the agent becomes hydrated and swelled to form a thickened mass, and subjecting the mass to a sterilization temperature exceeding its atmospheric boiling temperature.

5. The process of producing a sterilized oyster stew preparation comprising adding to the normal ingredients of the stew including milk a substantially pure starch up to substantially ten per cent of the mass and thereafter sterilizing the mass.

6. The process of producing a sterilized oyster stew preparation comprising adding to the normal ingredients of the stew including milk, corn starch and heating until the starch becomes hydrated and swelled to form a thickened mass, and thereafter sterilizing in closed receptacles.

7. A preserved and sterilized oyster stew preparation comprising milk as a normal ingredient and cornstarch in substantially pure condition.

In testimony whereof I affix my signature.

LE ROY V. STRASBURGER.